May 18, 1954 — S. WENNBERG — 2,679,023
AUTOMATIC STEERING DEVICE
Filed March 7, 1950 — 3 Sheets-Sheet 1

INVENTOR:
Sigurd Wennberg,

May 18, 1954 S. WENNBERG 2,679,023
AUTOMATIC STEERING DEVICE
Filed March 7, 1950 3 Sheets-Sheet 3

INVENTOR:
Sigurd Wennberg
By Ernst A. Marmark
His Agent.

Patented May 18, 1954

2,679,023

UNITED STATES PATENT OFFICE 2,679,023

AUTOMATIC STEERING DEVICE

Sigurd Wennberg, Asker, Norway

Application March 7, 1950, Serial No. 148,091

4 Claims. (Cl. 318—489)

The present invention relates to automatic gyro-pilot devices.

The invention has for its object to provide a simplified and accurate automatic gyro-pilot device, being—as contra-distinguished from hithertofore known automatic gyro-pilot devices—especially adapted to mass production and may therefore be used on most types of vessels. The power required for the running of the automatic part of the device may be taken from the same source as the electric light and/or from dry cells.

The types of automatic gyro-pilot devices hithertofore known are too expensive to be the object of mass production. They may only be used on larger sea going ships.

The present steering device is of a type, where the steering is performed by means of a gyro instrument. The main characteristic feature of the invention is that the gyro instrument is provided with a pointer consisting of two parts mounted on each side of a rotatable shaft and having two different functions. One part of the pointer has for its object to lead the current to a steering device controlled by electromagnets, while the other part of the pointer by means of a commutator cuts off the circuit to the windings of the electromagnet, when the rudder has turned an angle in accordance with the movement of the gyro instrument pointer. There is also arranged a rudder indicator electromagnetically controlled by the rudder and indicating its angular position.

The invention has also for its object to provide means for securing the correct interdependence of the gyro pointer, the rudder indicator and the rudder as well as to provide a special contact-arrangement to obtain a satisfying neutral position of the gyro pointer and the rudder.

Other characteristic features of the invention will appear from the following description with reference to the accompanying, diagrammatical drawings illustrating an embodiment of the invention.

Figure 1:
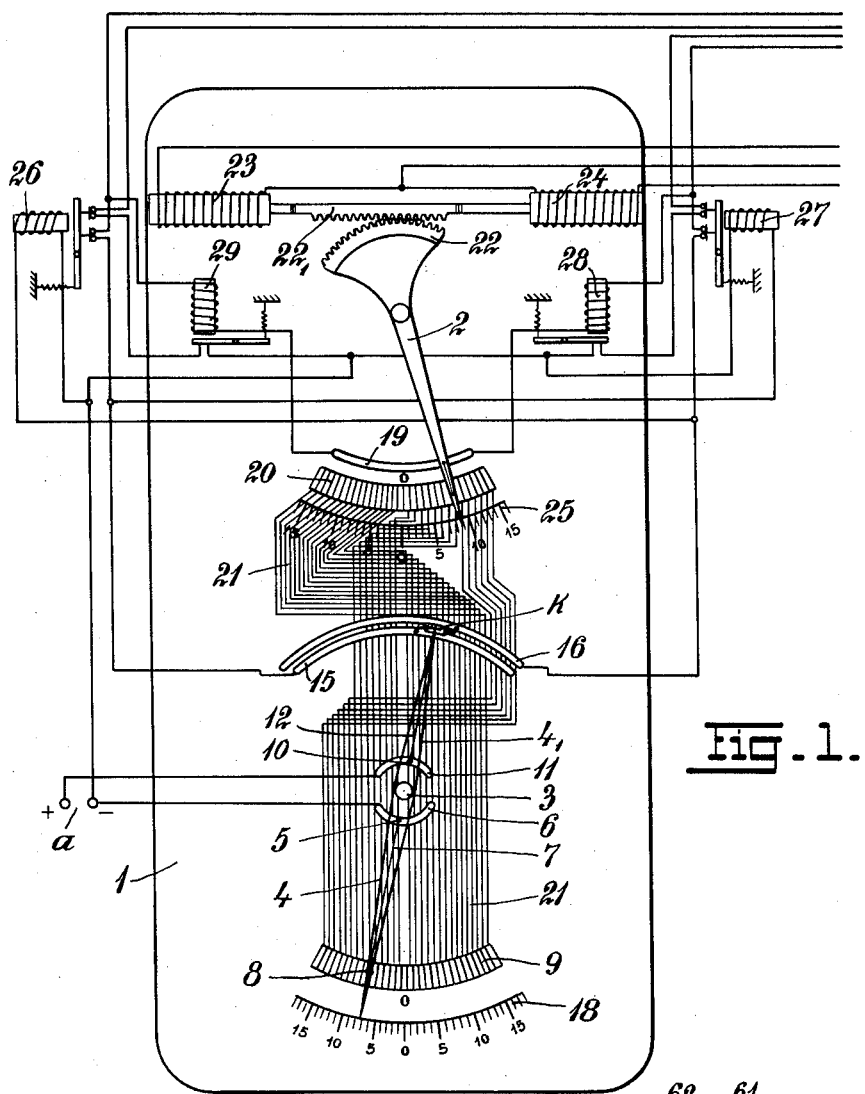
Figure 1 shows a diagram of the wiring between the gyro pointer and the rudder indicator, showing also a part of the connections to the steering apparatus and the rudder machine.
Figure 5:
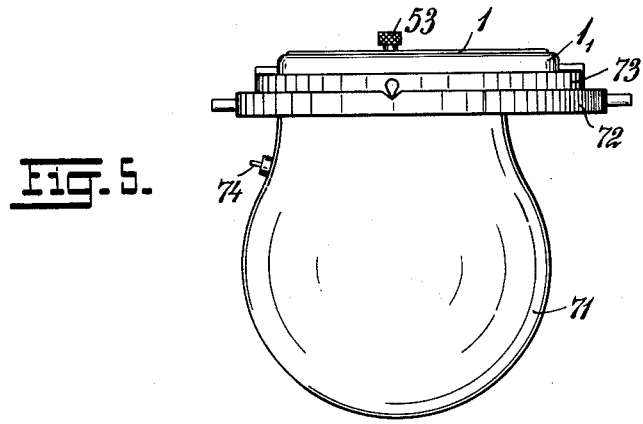
Figure 5 shows a side view of a complete gyro instrument according to the invention, Figure 6 a sectional view of the instrument and Figure 7 a top view of the same.
Figure 6:
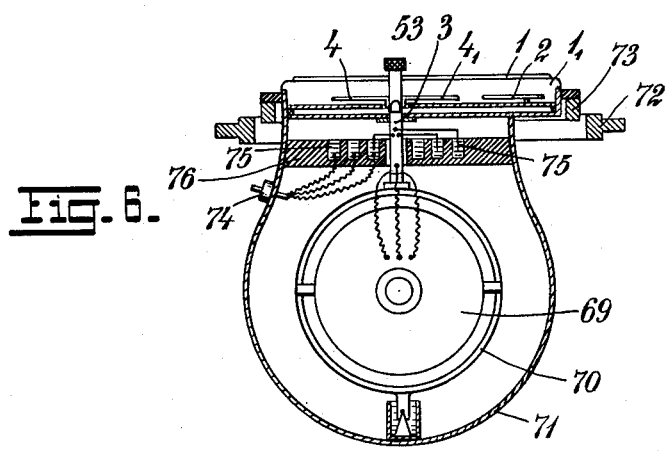
Figure 7:
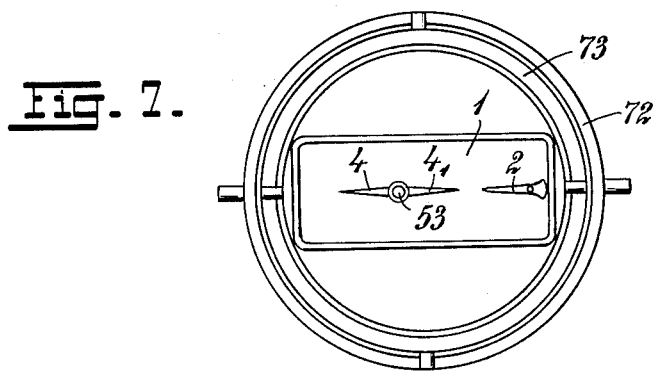

Referring to Figure 1 a transparent cover 1 is provided covering the upper side of a frame $1_1$ (Figures 5–7), in which there are pivotally mounted a gyro pointer 4, $4_1$ as well as a rudder indicator or rudder pointer 2, said frame $1_1$ being arranged on the top side of the gyroscope proper. The gyro pointer 4, $4_1$ is fastened to the vertical gyroscope shaft 3 and consists of two parts 4 and $4_1$ arranged in alignment on either side of the shaft 3. One part 4 of the pointer is provided with a sliding contact 5 bearing against a curved contact rail 6 and being by means of a conductor or the like 7 connected to a sliding contact 8 arranged on the said part 4 of the pointer and near the end of the same. Said sliding contact 8 bears against a collector 9, that is formed of lamellas or segments, and makes successively contact with the segments of the collector as the pointer is moving. The other part $4_1$ of the pointer is in the same manner provided with a sliding contact 10 bearing against a curved contact rail 11 and by means of a conductor or the like 12 being connected to a contact device K mounted on the said part $4_1$ of the pointer and near the end of the same. This contact device K, which may be arranged in a way to be described later, has two sliding contacts 13 and 14 (Figures 2 and 3) bearing against two curved, concentric contact rails 15 and 16. The part $4_1$ of the pointer is disposed with a certain play in connection with the contact device K in such a manner, that a contact 17 (Figure 2) arranged on the end part of the pointer and being connected with the conductor 12 makes contact with the one or the other of the sliding contacts 13, 14 and the sliding rails 15, 16 respectively as the gyro pointer is moving in one direction or the other. The end of the part 4 of the pointer is movable opposite a scale 18 that is provided with graduation.

The whole arrangement shown in Figure 1 and Figures 5, 6 and 7 respectively is suitably installed on the navigating bridge.

The curved contact rails 11 and 6 are connected to the plus and minus poles respectively of a direct current source $a$ of for instance 6–12 volts. One end part of the rudder indicator 2 completes during its rotation an electric connection between a contact rail 19 and one of the lamellas of a collector 20, said lamellas by means of conductors 21 being cross-connected with corresponding lamellas of the collector 9. The other end part of the rudder indicator 2 is formed as a toothed segment 22, the teeth of which are in mesh with a rack $22_1$ that is controlled at its ends by two oppositely arranged electromagnets 23 and 24. The rudder indicator 2 moves over a scale 25 provided with graduation. Two relays 26 and 27 are provided that have as will be understood from the following for their object to break two main current circuits, and two relays 28 and 29 are furthermore provided that, as will also appear from the following, operate for stopping the movement of the rudder when it has reached the position in accordance with the position of the gyro pointer.

Figure 4:
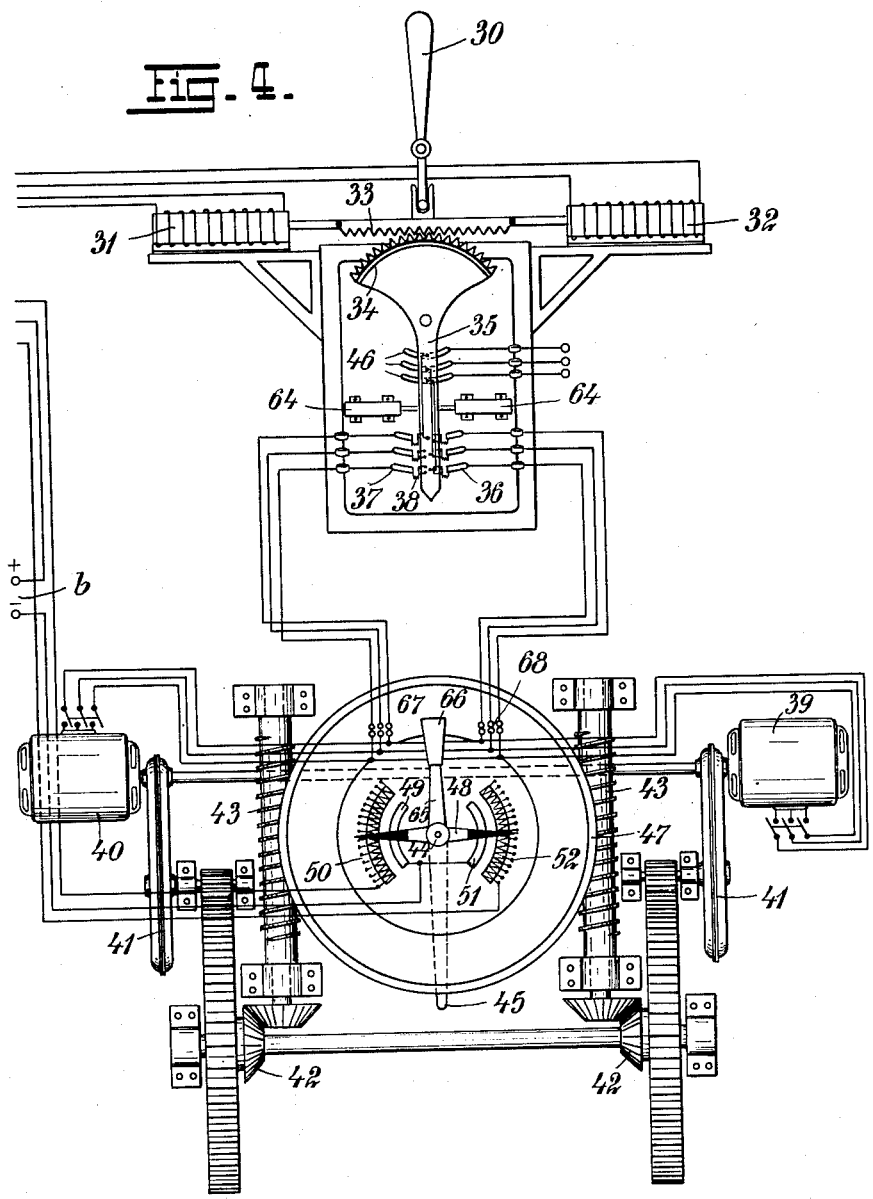
Figure 4 is a wiring diagram for the steering apparatus and the rudder machine.

In Figure 4 the top part shows the steering device placed on the bridge and being either operated manually by means of a handle or spike 30 or automatically in connection with the arrangement shown in Figure 1 by means of the electromagnets 31 and 32, a rack 33 being moved to the right or to the left and thus driving a tooth segment 34 on an arm 35, so that the lower part of the arm is being moved along sliding rails 36 and 37. Resistances 38 are thereby connected into or disconnected from the circuit through two motors 39 and 40, which by means of gears 41, 42 and 43 are adapted to turn the rudder stock 44 with the rudder 45.

The current to the contacts of the arm 35 passes through the contact rails 46 and further through the rails 36 and 37 respectively. Two of the leads from said rails are cross-connected in such a manner that the two motors, being connected in parallel, will rotate in opposite directions according to the side to which the arm 35 is being deflected.

47 indicates the rudder wheel. To the rudder stock 44 there is fixed a contact arm 48, the one half of which connecting a rail 49 with a regulating resistance 50, while the other half electrically interconnects a rail 51 with a regulating resistance 52. The rails 49, 51 are interconnected and are connected, through a low tension direct current supply b of for instance 6–12 volts, to the lead connecting the inner ends of the windings of the electromagnets 23 and 24, Figure 1. The outer ends of the said windings are connected to the corresponding regulating resistances 50 and 52 respectively.

The manner of operation of the device is as follows: The current switch for the gyroscope is closed. While the gyroscope is gaining speed, which take a few seconds, the course of the ship is set and then a coupling button on the gyro instrument is pushed in. Thereby the gyro pointer, which originally has zero position, is engaged to the gyro shaft, and the device is operating. If the ship changes its course, turning for instance to the left, the part 4 of the pointer will move to the left (Fig. 1) with regard to the scale 18. The other part $4_1$ of the pointer deflecting to the right then will connect the plus pole of the current supply through the rail 11 with the right side of the contact device K and the rail 16, this rail through the left hand side electromagnet 31 (Figure 4) being connected to the minus pole of the current supply. The one end part of the rack 33 thereby is being attracted, the said rack thus being moved to the left and turning the segment 34 counter-clockwise. The arm 35 thereby makes contact, the rudder motors 39 and 40 thus being started with the effect that the rudder 45 is being turned to the right. The contact arm 48 of the rudder stock 44 at the same time is being moved counter-clockwise along the regulating resistances 50, 52. Thereby resistance is being disconnected from the circuit of the electromagnet 23 and connected into the circuit of the electromagnet 24, the rudder pointer 2 thereby being deflected, moving along the collector 20. When the pointer reaches the lamella being connected to the lamella on the collector 9 contacting the gyro pointer, a circuit is closed from the minus pole over the rail 6, the gyro pointer, for instance the sixth lamella on the collector 9, the sixth lamella on the collector 20, the rudder indicator rail 19 and relay 28 to the plus pole, the circuit through the electromagnet 31 of the steering device thereby being interrupted so that the movement of the rudder 45 is stopped at a certain angle to the right. The degrees of the angle can be read on the scale 25, the movement of the rudder pointer 2 corresponding exactly with the movement of the rudder 45.

A third circuit from the plus pole over the rail 11, the pointer part $4_1$, the contact device K, the blocking relay 26 to the minus pole breaks the main circuit to the electromagnet 32, the main circuit to the electromagnets 31 and 32 having partly common connections. The rudder has been turned to the right, and the ship is turning back into the correct course. The gyro pointer 4, $4_1$ thereby makes contact to the left in the contact device K, and now a process corresponding to that described above is repeated with the difference that the rudder is being moved to return again towards the zero position.

Figure 2:
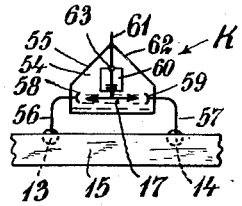
Figure 2 shows, at a larger scale, a longitudinal section of the contact device for the one part of the gyro pointer.
Figure 3:
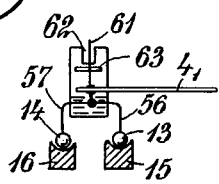
Figure 3 is a cross section of the same.

If the automatic gyro pilot device is to be put out of action, the current to the gyroscope is broken and the gyro pointer lifted out of its contact position by means of a lifting knob 53. The gyro pointer thereby is loosened from the shaft, so that it shall not be damaged. The contact device K is so constructed that the contact 17 is lifted out of its contact position when the pointer is being lifted. As shown in Figures 2 and 3 the contact device consists of a casing 54 provided with an upper wall 55 formed as a roof. The casing is of insulating material. Wires 56 and 57 connected to the sliding contacts 13 and 14 are fastened to the end walls of the casing, the ends of the wires projecting into the casing being provided with contacts 58, 59. The end part of the part $4_1$ of the pointer projects into the casing through an opening 60 in one side wall, the opening having such a size that the pointer contact 17 may have clearance between the contacts 58 and 59 without making contact when being in the middle position between the contacts. To the part of the pointer situated within the casing 54, a pin 61 is attached, said pin projecting upwards through a slot 62 in the roof of the casing. To the pin 61 is fastened a transverse pin 63 or the like, this pin 63 being a little longer than the width of the slot 62. As it will be understood the pin 63 will first be moved upwards into the upper corner of the roof 55 and then lift the entire contact device K upwards and out of its contact position. In order that the pointer when lifted shall be situated in its exact zero position suitable guiding devices, for instance two sloping metal pins or the like (not shown), may be fastened to the cover 1. The pointer then will be ready for use the next time the apparatus is being put into operation.

The steering apparatus may, when the gyro pointer is lifted, be used for manual steering by means of the spike 30.

The ballast resistances 38 in the steering apparatus are calculated so as to prevent the starting current in the motors 39, 40 from being too high. When therefore the rudder is turned a small angle, the resistance is large and the current in the motors correspondingly weak. The motors consequently will rotate slowly. The pending of the ship past the course line therefore can take place without the motors being damaged.

According to Figure 4 it is assumed that the rudder machine for the purpose of increased safety is provided with two synchronized transmission sets, but of course only one set may be used.

The steering apparatus is provided with resilient spring controlled zero adjustment devices 64 having for their object to bring the steering arm 35 into its zero position between each current impulse from the gyro instrument.

The rudder machine is further provided with a blocking device consisting of an arm 65 fastened to the rudder stock 44 and being in its free end provided with an insulating plate 66. If the rudder 45 is turning approximately 35° to the one side or the other, the current to the motors is broken by the plate 66 operating the switches 67 and 68 respectively.

It is assumed, that the ordinary compass of the ship is used. If the current in the gyro instrument should interfere with the compass, the gyro instrument may be provided with an extra casing and screened. Demagnetizing may also be used. The steering apparatus (Figure 4) is to be mounted in a container filled with transformer oil to avoid burns on the contacts. Also the contact device K (Figure 1) is filled with transformer oil in order to damp possible sparks, which might damage the platinum contacts.

A few details of the gyro instrument will be seen from Figures 5-8. 1 indicates the frame for the transparent cover I covering the gyro instrument and the rudder indicator 2, and 69 the gyroscope with the bow 70. The gyroscope is mounted in a container 71 of insulating material and is suspended in gimbals 72 and 73. The current to the gyroscope is conducted through a contact 74, fastened to the container, to circular grooves 75 filled with mercury and arranged in an insulating plate 76. From the grooves the current is by means of sliding contacts (tongue-shaped contacts) conducted through the shaft 3 to the gyro motor. Sliding contacts or tongue-shaped contacts on metal rails would cause too much friction. The swinging bow 70 is by means of a point bearing pivoted in a cup fastened to the bottom of the gyroscope container and filled with oil.

The constructive details of course may be performed differently from the details described and shown without departing from the scope of the invention:

I claim:

1. In a steering device, for use in connection with a ship, having a gyro instrument provided with an angularly movable contact pointer operable to cause turning of the rudder to compensate for variations in the course of the ship, in combination: a rudder actuator including motor means for driving the rudder, a setting device interconnected to said contact pointer and being operable to be set thereby and connected to said rudder actuator for operating the same to turn the rudder in accordance with the movement of said contact pointer, and a rudder indicator movable in synchronism with the rudder to indicate the momentary position thereof and cooperating with said contact pointer for restraining rudder movement beyond the angle to which said contact pointer has been moved; said contact pointer comprising two contact devices movable with said pointer, two parallel spaced contact rails adjacent one of said contact devices, two opposite electromagnets operatively positioned for moving said setting device, a rail being connected to each electromagnet, one of said contact devices being operable to interconnect one of said rails to one pole of an electric source when said pointer moves in one direction and, respectively, to interconnect the other rail to said one pole of said source when said pointer moves in the opposite direction, for alternatively energizing an electromagnet to set said setting device, a collector having a plurality of lamellae adjacent said other contact device, said rudder indicating device including a plurality of segments, each segment thereof corresponding, and being electrically interconnected, to a lamella of said collector, said other contact device being in sliding contact with said collector and operable to interconnect a lamella thereof, corresponding to the angular position to which the pointer has been moved, to the other pole of said electric source, said rudder indicator being in sliding contact with said segments thereof and being operable to complete a circuit with said lamella in contact with said other sliding contact, whereby said rudder actuator will be de-energized when said rudder indicator has reached a position corresponding to the position of said contact pointer for holding the rudder in the desired compensating position, and means intermediate said first contact device and said rails and operable to limit interconnection to one of said rails in each direction of movement of said contact pointer.

2. In a steering device, as claimed in claim 1, said last named means including two slidable contacts each sliding on one of said rails, a gap formed between said slidable contacts, and an element having two opposite terminals disposed intermediate said slidable contacts and normally spaced therefrom and being operable to bridge the space and to make contact with one of said slidable contacts when said contact pointer is moved in one direction for interconnection of said sliding contact with the rail of said slidable contact, and, respectively, to make contact with the other slidable contact when said contact pointer is moved in the opposite direction, for electric interconnection, and being operable to interrupt said electric interconnections in the normal position.

3. In a steering device, as claimed in claim 1, together with, relay means operable to de-energize one electromagnet when the other is interconnected to said one pole of said source.

4. In a steering device, as claimed in claim 1, together with, manual actuating means connected to said setting device and operable for moving the same by hand whereby said rudder will be turned.

References Cited in the file of this patent

UNITED STATES PATENTS

| Number | Name | Date |
|---|---|---|
| 739,572 | Armstrong | Sept. 22, 1903 |
| 800,654 | Kitsee | Oct. 3, 1905 |
| 811,539 | Bates | Feb. 6, 1906 |
| 835,382 | Willard | Nov. 6, 1906 |
| 877,311 | Evershed | Jan. 21, 1908 |
| 2,085,442 | Newell | June 29, 1937 |
| 2,383,942 | Patin | Sept. 4, 1945 |
| 2,493,844 | Yardeny | Jan. 10, 1950 |